US012570205B2

(12) United States Patent
Binder et al.

(10) Patent No.: US 12,570,205 B2
(45) Date of Patent: Mar. 10, 2026

(54) LIGHTING DEVICE FOR A MOTOR VEHICLE

(71) Applicant: Bayerische Motoren Werke Aktiengesellschaft, Munich (DE)

(72) Inventors: Thomas Binder, Munich (DE); Mathias Roennfeldt, Putzbrunn (DE); Katharina Santner, Munich (DE); Rene Uebler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 292 days.

(21) Appl. No.: 18/020,117

(22) PCT Filed: Oct. 6, 2021

(86) PCT No.: PCT/EP2021/077477
§ 371 (c)(1),
(2) Date: Feb. 7, 2023

(87) PCT Pub. No.: WO2022/089895
PCT Pub. Date: May 5, 2022

(65) Prior Publication Data
US 2023/0226966 A1     Jul. 20, 2023

(30) Foreign Application Priority Data

Oct. 30, 2020    (DE) ..................... 10 2020 128 556.6

(51) Int. Cl.
*B60Q 1/00*          (2006.01)
*B60Q 1/26*          (2006.01)
(Continued)

(52) U.S. Cl.
CPC ......... *B60Q 1/0041* (2013.01); *B60Q 1/2607* (2013.01); *F21S 43/14* (2018.01);
(Continued)

(58) Field of Classification Search
CPC ...... B60Q 1/0041; B60Q 1/2607; B60Q 3/60; F21S 41/143; F21S 41/147; F21S 41/148;
(Continued)

(56) References Cited

U.S. PATENT DOCUMENTS

| | | | | |
|---|---|---|---|---|
| 4,577,260 A | * | 3/1986 | Tysoe | F21S 43/40 |
| | | | | 362/268 |
| 4,652,979 A | * | 3/1987 | Arima | F21S 43/26 |
| | | | | 362/268 |

(Continued)

FOREIGN PATENT DOCUMENTS

| | | | | |
|---|---|---|---|---|
| CN | 104641167 B | * 10/2019 | ......... | G02B 27/0905 |
| DE | 10 2008 035 765 A1 | 2/2010 | | |

(Continued)

OTHER PUBLICATIONS

International Search Report (PCT/ISA/210) issued in PCT Application No. PCT/EP2021/077477 dated Dec. 20, 2021 with English translation (six (6) pages).

(Continued)

*Primary Examiner* — Stephen R Burgdorf
(74) *Attorney, Agent, or Firm* — Crowell & Moring LLP

(57)          ABSTRACT

A lighting device for a motor vehicle includes a lighting component having one or more light sources and one or more transparent facet bodies, each of which bodies has a surface consisting of a plurality of planar first facets. Light originating from the one or more light sources is radiated into the one or more transparent facet bodies as first luminous radiation. The first luminous radiation is at least partially refracted on first facets of the one or more transparent facet bodies and subsequently exits the lighting device as second luminous radiation in order to produce light distribution. One or more translucent optical compo- (Continued)

nents are located in the lighting device between the lighting component and the one or more transparent facet bodies.

20 Claims, 3 Drawing Sheets

(51) Int. Cl.

| | | |
|---|---|---|
| *F21S 43/14* | (2018.01) | |
| *F21S 43/15* | (2018.01) | |
| *F21S 43/20* | (2018.01) | |
| *F21S 43/31* | (2018.01) | |
| *F21W 103/10* | (2018.01) | |
| *F21W 103/20* | (2018.01) | |
| *F21W 103/55* | (2018.01) | |

(52) U.S. Cl.
CPC ............... *F21S 43/15* (2018.01); *F21S 43/26* (2018.01); *F21S 43/315* (2018.01); *F21W 2103/10* (2018.01); *F21W 2103/20* (2018.01); *F21W 2103/55* (2018.01)

(58) Field of Classification Search
CPC ........ F21S 41/265; F21S 41/333; F21S 43/14; F21S 43/15; F21S 43/26; F21S 43/243; F21S 43/249; F21S 43/315; F21W 2103/10; F21W 2103/20; F21W 2103/55
USPC .......................................................... 340/468
See application file for complete search history.

(56) References Cited

U.S. PATENT DOCUMENTS

| | | | | |
|---|---|---|---|---|
| 6,266,476 | B1 * | 7/2001 | Shie ...................... | F21S 43/249 |
| | | | | 359/566 |
| 6,953,271 | B2 * | 10/2005 | Aynie ...................... | F21S 43/14 |
| | | | | 362/540 |
| 9,497,380 | B1 * | 11/2016 | Jannard .................. | H04N 23/90 |
| 2006/0007692 | A1 | 1/2006 | Hsien | |
| 2010/0027282 | A1 | 2/2010 | Gebauer et al. | |
| 2015/0233540 | A1 * | 8/2015 | Krijn ....................... | F21S 41/20 |
| | | | | 362/520 |
| 2016/0325790 | A1 * | 11/2016 | Murray .................. | B62D 35/00 |
| 2019/0032908 | A1 * | 1/2019 | Tsuchiya ................. | F21S 43/31 |
| 2019/0092216 | A1 | 3/2019 | Min et al. | |
| 2019/0170317 | A1 | 6/2019 | Gloss et al. | |
| 2021/0101520 | A1 * | 4/2021 | Schellinger ............... | F21K 9/00 |
| 2023/0213164 | A1 * | 7/2023 | Yoshino ................ | F21S 43/243 |
| | | | | 362/511 |
| 2024/0263757 | A1 * | 8/2024 | Kreipe .................. | F21S 43/249 |

FOREIGN PATENT DOCUMENTS

| | | | | |
|---|---|---|---|---|
| DE | 10 2014 218 991 A1 | 3/2016 | | |
| DE | 10 2017 106 441 A1 | 9/2018 | | |
| DE | 20 2018 004 425 U1 | 11/2018 | | |
| DE | 10 2018 130 056 A1 | 6/2019 | | |
| ES | 2738004 T3 * | 1/2020 | .......... | B60Q 1/2607 |
| FR | 2727742 A1 * | 6/1996 | .......... | B60Q 1/302 |
| IT | 1128804 B * | 6/1986 | .............. | B60Q 1/22 |
| JP | 2019-22411 A | 2/2019 | | |
| WO | WO-2013139962 A1 * | 9/2013 | .......... | G02B 5/0221 |
| WO | WO 2017/021622 A1 | 2/2017 | | |
| WO | WO 2017/036787 A1 | 3/2017 | | |

OTHER PUBLICATIONS

German-language Written Opinion (PCT/ISA/237) issued in PCT Application No. PCT/EP2021/077477 dated Dec. 20, 2021 (six (6) pages).

German-language Search Report issued in German Application No. 10 2020 128 556.6 dated Aug. 9, 2021 with partial English translation (12 pages).

\* cited by examiner

LIGHTING DEVICE FOR A MOTOR VEHICLE

BACKGROUND AND SUMMARY OF THE INVENTION

The invention relates to a lighting device for a motor vehicle and to a corresponding motor vehicle.

It is known from the prior art to use a body having facet faces in a motor vehicle lighting device in order to generate a light distribution. For example, the document WO 2017/036787 A1 describes a vehicle lamp having a transparent component which comprises a plurality of facet faces. A plurality of light sources are provided in the vehicle lamp, their light being reflected at the facet faces of the component or passing through the component.

By using bodies having facet faces, different light functions may be produced in a motor vehicle lighting device. In this case, however, the problem arises that the light spots of the individual light sources radiating in are still visible because of the transparency of the bodies, which is an undesired effect.

It is an object of the invention to provide a lighting device for a motor vehicle, which comprises one or more facet bodies and generates a uniform light distribution.

This object is achieved by the lighting device of the claimed invention.

The lighting device according to embodiments of the invention is intended for a motor vehicle, the motor vehicle preferably being an automobile, or possibly a truck or a motorcycle. When interactions between the lighting device and the motor vehicle are described below, and particularly in the patent claims, this is always intended to mean that the interaction takes place when the lighting device is arranged, or installed, in the motor vehicle.

The component parts of the lighting device which have a corresponding interaction with the motor vehicle, or components of the motor vehicle, are therefore configured in such a way that the interaction is brought about when the lighting device is arranged, or installed, in the motor vehicle.

The lighting device according to embodiments of the invention is preferably a signal lamp for emitting light into the area around the motor vehicle, that is to say it is used for signaling in the surroundings of the motor vehicle and not for active illumination of the surroundings, as is the case with a headlamp. Optionally, the lighting device according to embodiments of the invention may also be interior lighting for a motor vehicle.

The lighting device according to embodiments of the invention comprises a lighting component having one or more light sources and one or more transparent facet bodies, each of which comprises a surface consisting of a plurality of planar first facets. In one preferred embodiment, the first facets are ground facets. Preferably, the entire surface of a respective facet body is formed from facets. A transparent facet body is in this case intended to mean a facet body which transmits at least a part of the incident light radiation. Preferably, a corresponding facet body is formed from a material having a transmissivity of 50% or more, particularly preferably 90% or more and in particular 95% or more.

The lighting device according to embodiments of the invention is configured in such a way that light which emanates from the light source or the light sources of the lighting component radiates into the facet body or bodies as first light radiation, the first light radiation being refracted at least partially at first facets of the facet body or of the facet bodies and subsequently emerging from the lighting device as second light radiation in order to produce a light distribution.

The lighting device according to embodiments of the invention is distinguished in that one or more translucent optical components are arranged between the lighting component and the facet body or bodies, the term translucency being intended to mean that the optical components consist of a material which at least partially transmits light incident thereon. Preferably, the optical component has a transmissivity of 50% or more, particularly preferably 90% or more and in particular 95% or more. Each optical component comprises an entry side for the entry of light of the lighting component into the respective optical component and an exit side for the exit of light which has entered through the entry side out from the respective optical component. Light which emerges from the optical component or components is radiated as the first light radiation into the facet body or bodies. In this case, only a part of the emerging light may optionally form the first light radiation which is radiated into the facet body or bodies.

The exit side of a respective optical component comprises a light-scattering structure consisting of facets, which are referred to below as second facets in order to distinguish them from the facets of the corresponding facet bodies. The second facets are provided in a plurality of different dimensions and are aligned in a plurality of different directions in space. A chaotic facet structure is therefore provided on the corresponding exit side, so that scattered light is created when the light exits from the optical component. This scattered light is again refracted in the corresponding facet bodies, so that appealing light effects may be achieved. The fact that scattered light enters the facet bodies ensures that the individual light sources are no longer perceptible in the light distribution generated by the lighting device.

In one preferred embodiment, a respective optical component of at least some of the optical components comprises a deviating surface. Preferably, each optical component which is present has such a deviating surface. The term at least some of the optical components is intended here and in what follows to mean that this is a single optical component if the lighting device comprises only one optical component, or at least one optical component if the lighting device comprises a plurality of optical components. The deviating surface of a respective optical component is configured to deviate at least a part of the light which has entered through the entry side in the direction of the exit side by way of this surface. The deviation preferably takes place by way of total internal reflection at the deviating surface. In other words, light whose angle of incidence exceeds the critical angle at the interface between the material of the optical component and the surroundings impinges on the deviating surface. In the case of deviation by way of total internal reflection, it is not necessary for a reflective layer to be applied on the deviating surface.

In another preferred embodiment, the lighting device according to the invention is configured in such a way that the main beam direction (that is to say the direction with the highest luminous intensity) of the light source or of the light sources of the lighting component extends substantially in the vertical direction when the lighting device is installed in the motor vehicle, a respective optical component of at least some of the optical components, and preferably each optical component which comprises a corresponding deviating surface, being configured in such a way that its entry side is arranged next to at least some of the light sources in the vertical direction and its exit side is arranged next to at least some of the facet bodies in the horizontal direction. Light of the at least some light sources in this case enters its entry face and light which emerges through its exit side is radiated into the at least some facet bodies. The term at least some of the light sources is in this case intended to mean that this is a single light source if only one light source is provided in the lighting device. If there are a plurality of light sources, on the other hand, at least some of the light sources refers to one or more of the light sources which are present. Similarly, at least some of the facet bodies refers to a single facet body if only one facet body is provided, and otherwise, that is to say in the case of a plurality of facet bodies, at least one of the facet bodies which are present.

With the embodiment just described, light deviation from a vertical emission direction to a horizontal emission direction may be achieved, and a compact structure of the lighting device may thereby be realised. Depending on the configuration, the main emission direction may be the upward direction or optionally the downward direction.

In another preferred embodiment, in a respective optical component of at least some of the optical components, and preferably in all the optical components which are present, the second facets are configured as elevations respectively consisting of a plurality of second facets, the elevations protruding from the respective optical component from a predetermined exit plane. The exit plane may in some sections be formed by planar sections of the optical component, the individual elevations being separated from one another by these planar sections. Nevertheless, it is also possible for the elevations to be directly adjacent to one another. In this case, the exit plane is a pure virtual plane. With the embodiment just described, simple producibility of the corresponding optical components is ensured.

In another preferred variant, on a respective optical component of at least some of the optical components, and preferably on all the optical components which are present, one or more collimator optical units are provided on or next to its entry side, a respective collimator optical unit which concentrates the light of the individual light source in each case being separately assigned an individual light source of the lighting component. In other words, for each collimator optical unit there is a different light source, the light of which is concentrated by way of the optical unit. With this variant, controlled beam entry into the corresponding optical components in the form of concentrated radiation is ensured.

Depending on the configuration, the corresponding optical components may be made from different material. In one preferred embodiment, a respective optical component of at least some of the optical components, and preferably each optical component which is present, is a plastic component. Nevertheless, at least some of the optical components may optionally also be made from glass. The use of plastic has the advantage that it is simpler to process and has a lower weight in comparison with glass.

Depending on the configuration, the light source or light sources may comprise one or more polychromatic light sources and/or one or more monochromatic light sources. Optionally, it is also possible to use light sources whose light color may be varied by corresponding control, for example RGB light sources. By the use of light sources with an adjustable color, or different colors, different light functions may be produced in the lighting device according to embodiments of the invention by corresponding control of the light sources, for example a flashing light or a daytime running light, as will be described in more detail below.

If polychromatic light sources, and in particular white light sources, are used in the lighting device according to embodiments of the invention, their light may be spectrally broken up by way of light refraction at the first facets of the facet body, so that an appealing light distribution with a rainbow effect can be generated.

The facet bodies installed in the lighting device according to embodiments of the invention may be configured in different ways. In one variant, at least one facet body, and optionally each facet body, is formed from glass, preferably crystal glass. Alternatively or in addition, at least one facet body, and optionally each facet body, may also be formed from plastic.

In another particularly preferred embodiment, a respective light source of the lighting component is a substantially point light source. Preferably, a respective point light source is an LED unit consisting of one or more LEDs (for example an RGB LED unit) or a laser light source consisting of one or more laser diodes (for example an RGB laser light source). If the LED unit or the laser light source contains a plurality of LEDs or laser diodes, these are arranged close to one another in such a way that the point-like nature of the light sources is maintained.

In another embodiment, the lighting component of the lighting device can be operated in one or more operating modes, light for a light function which is assigned to the respective operating mode being provided in a respective operating mode. The light function need not in this case necessarily be produced only by the light of the lighting component. Optionally, at least one further lighting component which provides the light for the corresponding light function may also be provided.

In one preferred variant of the embodiment just described, the operating mode or the operating modes comprise one or more of the following operating modes:

an operating mode for providing a flashing light as a light function;

an operating mode for providing a daytime running light as a light function;

an operating mode for providing a position light as a light function;

an operating mode for providing light sequencing before starting or after parking of the motor vehicle.

The operating mode mentioned last may be coupled with various events. For example, the light sequencing may be started when a user approaching the motor vehicle is detected. The light sequencing may likewise be initiated by a user unlocking or locking the motor vehicle.

In another preferred configuration, the lighting component comprises one or more lighting groups respectively consisting of one or more light sources, the light source or the light sources of a lighting group respectively emitting light with the same color and the light sources of different groups emitting light with a different color. A color may in this case also be a mixture of a plurality of spectral colors, which is for example the case with white light. This variant of the invention is preferably combined with the embodiment described above which relates to the operation of the lighting component in various operating modes. One lighting group is in this case assigned to each operating mode, only the light source or the light sources of the assigned lighting group being turned on in the respective operating mode. For example, one lighting group may consist of one or more light sources with a yellow light color, which is turned on in order to produce a flashing light, while another lighting group consists of white light sources, which are for example activated in order to provide a daytime running light or position light.

In another configuration of the lighting device according to the invention, the lighting component, the optical component or components and the one or more facet bodies are accommodated in a common housing which comprises a transparent lens for the light exit. In this way, a lighting module which can be installed flexibly at different positions in the motor vehicle is formed by the lighting device.

As already mentioned above, at least one further lighting component, which is for example additionally used to produce a corresponding light function, may also be installed in the lighting device according to embodiments of the invention besides the lighting component consisting of one or more light sources. In one embodiment, a further lighting component in the form of one or more light guides, from which light of a corresponding light source is extracted, for example for a daytime running light and/or a flashing light, is provided.

In another preferred configuration, the lighting device according to the invention is configured to be installed above a vehicle headlamp in the vertical direction. The lighting device therefore represents a suitable addition to the headlamp light (that is to say low beam and high beam) and may, for example, provide the light function of the flashing light and/or daytime running light and/or position light.

The invention furthermore includes a motor vehicle which comprises one or more of the lighting devices according to the invention, or one or more preferred variants of the lighting device according to the invention.

An exemplary embodiment of the invention will be described in more detail below with the aid of the appended figures.

DETAILED DESCRIPTION OF THE DRAWINGS

Figure 1:
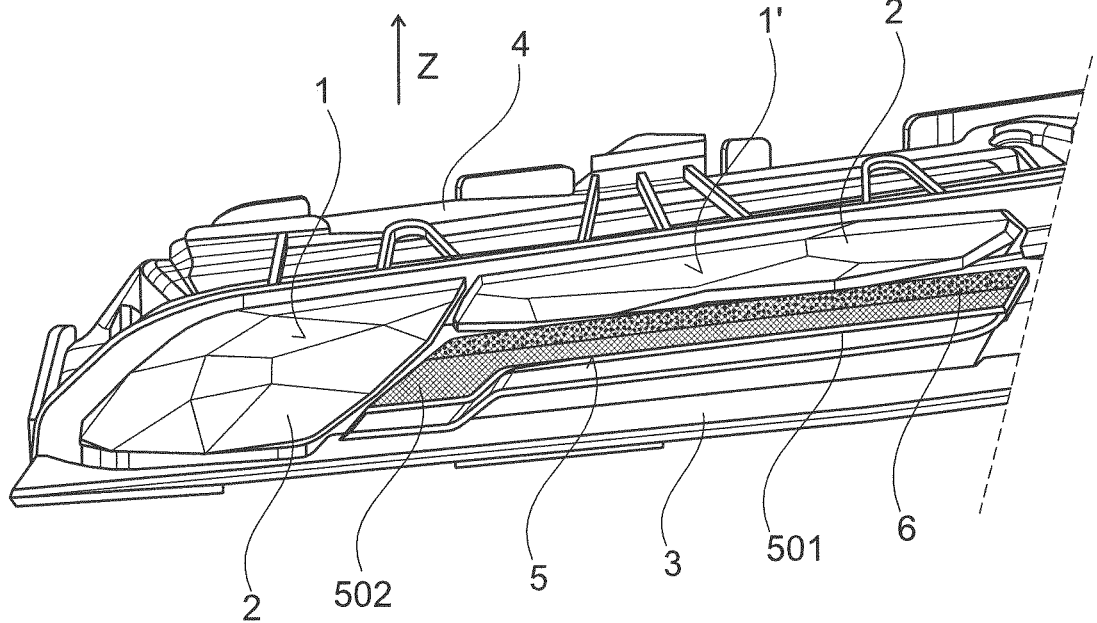
FIG. 1 shows a perspective representation of one embodiment of a lighting device according to the invention, only one half of the lighting device being depicted.

An embodiment of the invention will be described below with reference to a vehicle signal lamp, which is installed above a front headlamp (not shown) of a motor vehicle. This vehicle signal lamp may be seen from the perspective representation of FIG. 1. Only a first half of the vehicle signal lamp is shown in this case. In the view of FIG. 1, the vehicle signal lamp continues from the first half represented toward the right in a second half, the structure of which corresponds to the first half, that is to say the second half contains the same arrangement of the facet bodies described below with light guides lying underneath.

Figure 2:
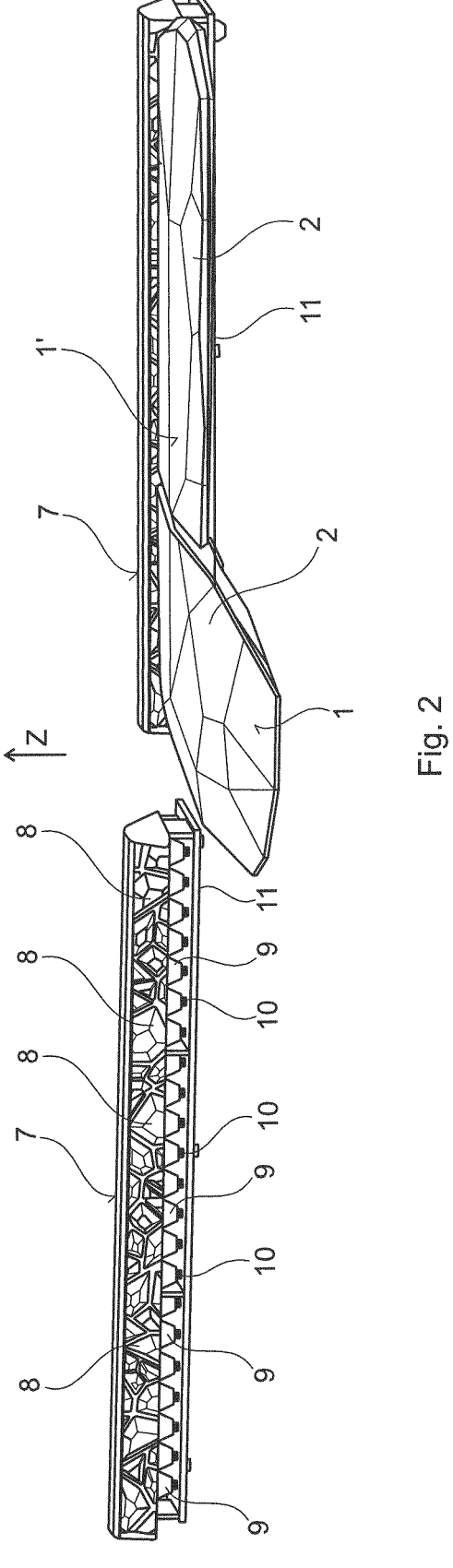
FIG. 2 shows a perspective representation in which both halves of the lighting device of FIG. 1 are represented, only those components being depicted which are essential to the embodiment of the invention.
Figure 3:
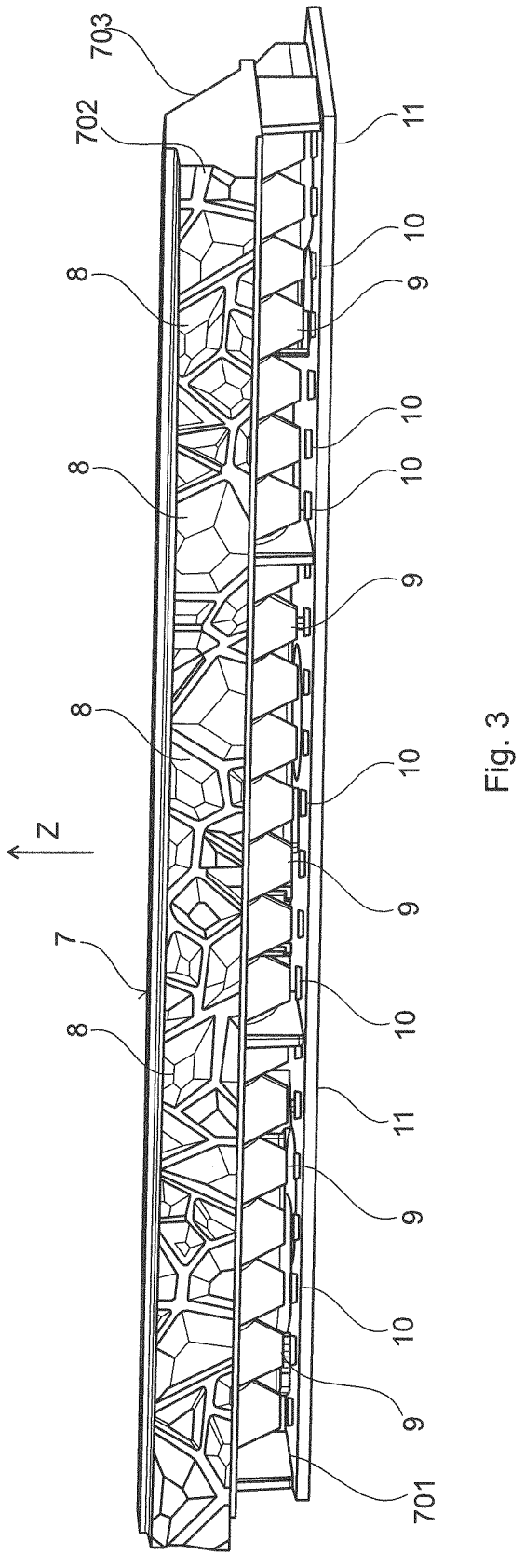
FIG. 3 shows a perspective representation which depicts an enlargement of one of the optical components of FIG. 2.

In FIG. 1, as well as in the further FIGS. 2 and 3, the vertical direction, and therefore the height direction of the motor vehicle, is constituted by the Z axis. The vehicle signal lamp represented is installed in a housing, which is located above the left headlamp of the motor vehicle. The housing cannot be seen in FIG. 1. In FIGS. 1 to 3, only the components relevant for the embodiment of the invention are denoted with references. Only these components will be described in detail below.

The vehicle signal lamp comprises in total four facet bodies in the form of two mutually adjacent pairs of corresponding facet bodies 1 and 1'. The respective facet bodies 1 have a bellied shape, while the facet bodies 1' are elongately configured. The individual facet bodies consist of glass and comprise a plurality of ground planar facets 2, only some of which are denoted with this reference for reasons of clarity. Below the facet body 1' of the pair of facet bodies 1, 1' which is represented in FIG. 1, there is a diffuser lens 5 which comprises a horizontally extending section 501 and an obliquely extending section 502. Behind the diffuser lens 5, there are three horizontally extending light guides 6, only the uppermost of these light guides being indicated by a dotted section in FIG. 1. Each light guide is supplied with light by an assigned LED (not shown); the color of the LEDs may vary.

The light guides 6 which are arranged below the facet bodies 1' in both halves of the vehicle signal lamp, and which are covered by the corresponding diffuser lens 5, are used to produce a flashing light and a daytime running light. When the daytime running light is activated, the corresponding LEDs radiate white light into the light guides 6. In the case of activating the flashing light, the LEDs radiate yellow light into the light guides 6, the LEDs furthermore being turned on and off with a predetermined frequency. The corresponding facet bodies 1 and 1' are used to assist the function of the daytime running light, or of the flashing light, by light being radiated by way of the light sources described below into the facet bodies when the corresponding light function is activated. In order to ensure that the light generated by the signal lamp emerges only through the diffuser lens 5, or the facet bodies 1 and 1', the signal lamp furthermore contains a lower opaque mask 3 and an upper opaque mask 4, which extend continuously from the first half to the second half of the vehicle signal lamp.

The view of FIG. 2 shows the first half and the second half of the vehicle signal lamp of FIG. 1, only the pair of facet bodies 1 and 1' from the second half being depicted, in order to reveal the interior of the lamp. As may be seen from FIG. 2, a corresponding transparent optical component 7 made of plastic, which is an essential component of the vehicle signal lamp, is located behind each pair of the two facet bodies 1, 1'. The optical component will also be referred to as a thick-walled optical unit.

Each optical component 7 comprises a front side, which has a chaotic structure consisting of a plurality of irregularly arranged facets 8 (only some of which are denoted with references). In other words, there are facets in a plurality of different polygonal shapes with different sizes and alignments with respect to one another. On the lower side of each thick-walled optical unit, there are a plurality of funnel-shaped collimator optical units 9, known per se, which are integral constituents of the thick-walled optical unit. Arranged below these collimator optical units 9, there is a circuit board 11 on which a plurality of LEDs 10 are arranged, the latter appearing as black points in FIG. 2. For reasons of clarity, only some of the collimator optical units and the LEDs are denoted with the reference 9 and 10, respectively. The LEDs are controlled by way of a control unit (not shown), which is connected to the circuit board 11.

Below each thick-walled optical unit 7, there are in total 22 LEDs, eleven yellow-emitting LEDs and eleven white-emitting LEDs being provided, which alternate along the longitudinal direction of the circuit board 11. Each LED 10 has precisely one collimator optical unit 9, which lies above the corresponding LED and leads to concentration of the light emitted by the latter. The thick-walled optical unit 7 therefore comprises in total 22 collimator optical units 9. When the daytime running light is activated, alongside the light guides 6 of FIG. 1, the white light LEDs on the two circuit boards 11 are turned on, while when the flashing light function is activated the yellow LEDs, which flash synchronously together with the light guides 6, are activated.

The precise structure of the thick-walled optical unit 7 with the circuit board 11 lying underneath may be seen from the detail representation of FIG. 3. The thick-walled optical unit comprises an entry side 701, which forms the lower side of the thick-walled optical unit with the collimator optical units 9 provided thereon. Furthermore provided are a front exit side 702 with the chaotic facet structure and a planar back deviating surface 703, which extends obliquely and deviates by total internal reflection light which enters the thick-walled optical unit. The light that has been deviated emerges from the thick-walled optical unit 7 via the exit side 702.

When the corresponding light function is activated, the yellow or white LEDs 10 start to shine and radiate light through the respective collimator optical units 9 into the entry side 702 of the thick-walled optical unit. A large portion of the light which has entered the thick-walled optical unit is directed via the obliquely extending deviating surface 703 toward the exit side 702 of the thick-walled optical unit 7. At the exit side, the light then emerges through the chaotic structure of facets 8, so that scattered light is created there. As may be seen from FIG. 3, the chaotic facet structure consists of a plurality of elevations, each of which comprises a plurality of facets 8 and which are separated from one another by vertical sections of the thick-walled optical unit. For reasons of clarity, again only some facets are provided with references. Optionally, it is also possible for the elevations to be directly adjacent to one another at least in some sections.

The scattered light generated by the facets 8 enters the facet bodies 1 and 1' lying in front of the thick-walled optical unit 7 and is reflected and refracted in the facet bodies. A part of the light finally emerges through the front side of the facet bodies and the cover lens of the vehicle signal lamp. By the configuration of the facet bodies as glass bodies with ground facets, an appealing light effect is in this case generated in the form of scintillation. When white light is radiated in, a light distribution with a rainbow effect may furthermore be achieved by the spectral breakup of the light.

The embodiment described above has a number of advantages. In particular, scattered light, which is radiated into corresponding facet bodies, is generated in a straightforward way from point light sources by thick-walled optical units with chaotic light exit faces. In this way, uniform illumination of the facet bodies is possible without individual light spots being identifiable. This leads to an appealing warm light appearance of the vehicle signal lamp. Furthermore, the cold light appearance when the vehicle signal lamp is turned off is also improved. In particular, when looking into the interior of the lamp, the crystal structure of the front facet bodies continues back through the facets of the thick-walled optical unit and a scintillating effect may also be achieved when external light (for example sunlight) shines in.

LIST OF REFERENCES 1, 1' facet body
2 facets of the facet bodies
3,4 masks
5 diffuser lens
501 horizontal section of the diffuser lens 502 oblique section of diffuser lens
6 light guide
7 thick-walled optical unit
701 entry side of the thick-walled optical unit
702 exit side of the thick-walled optical unit
703 deviating surface of the thick-walled optical unit
8 facets of the thick-walled optical unit
9 collimator optical unit of the thick-walled optical unit
10 LED light sources
11 circuit board
Z vertical direction

The invention claimed is:

1. A lighting device for a motor vehicle, the lighting device comprising:

a lighting component having one or more light sources and one or more transparent facet bodies, each of which comprises a surface consisting of a plurality of planar first facets, wherein light which emanates from the one or more light sources of the lighting component radiates into the one or more transparent facet bodies as first light radiation, the first light radiation being refracted at least partially at first facets of the one or more transparent facet bodies and subsequently emerging from the lighting device as second light radiation in order to produce a light distribution, and one or more translucent optical components that are arranged between the lighting component and the one or more transparent facet bodies, each of which optical components has an elongated shape and comprises an entry side for entry of light of the lighting component into the respective optical component and an exit side for exit of light which has entered through the entry side out from the respective optical component, light which emerges from the optical component or components being radiated as the first light radiation into the one or more transparent facet bodies, the exit side of the respective optical component comprising a light-scattering structure consisting of a plurality of planar second facets which are irregularly arranged in three dimensions and are aligned in a plurality of different directions in space.

2. The lighting device as claimed in claim 1, wherein a respective optical component of at least some of the one or more translucent optical components comprises a deviating surface which deviates at least a part of the light which has entered through the entry side in the direction of the exit side.

3. The lighting device as claimed in claim 1, wherein a respective optical component of at least some of the one or more translucent optical components comprises a deviating surface which deviates at least a part of the light which has entered through the entry side in the direction of the exit side, by way of total internal reflection at the deviating surface.

4. The lighting device as claimed in claim 1, wherein the lighting device is configured such that a main beam direction of the one or more light sources of the lighting component extends substantially in a vertical direction when the lighting device is installed in the motor vehicle, a respective optical component of at least some of the one or more translucent optical components being configured such that its entry side is arranged next to at least some of the one or more light sources in the vertical direction and its exit side is arranged next to at least some of the one or more transparent facet bodies in a horizontal direction, light of the at least some of the one or more light sources entering its entry face and light which emerges through its exit side radiating into the at least some of the one or more transparent facet bodies.

5. The lighting device as claimed in claim 1, wherein in a respective optical component of at least some of the one or more translucent optical components, the second facets are configured as elevations respectively consisting of a plurality of second facets, the elevations protruding from the respective optical component from a predetermined exit plane.

6. The lighting device as claimed in claim 1, wherein on a respective optical component of at least some of the one or more translucent optical components, one or more collimator optical units are provided on or next to its entry side, a respective collimator optical unit which concentrates the light of the individual light source being separately assigned an individual light source of the lighting component.

7. The lighting device as claimed in claim 1, wherein a respective optical component of at least some of the one or more translucent optical components is a plastic component.

8. The lighting device as claimed in claim 1, wherein the one or more light sources comprise one or more polychromatic light sources and/or one or more monochromatic light sources.

9. The lighting device as claimed in claim 1, wherein at least one facet body is formed from glass, and/or at least one facet body is formed from plastic.

10. The lighting device as claimed in claim 1, wherein at least one facet body is formed from crystal glass, and/or at least one facet body is formed from plastic.

11. The lighting device as claimed in claim 1, wherein a respective light source of the lighting component is a substantially point light source.

12. The lighting device as claimed in claim 11, wherein the respective light source is an LED unit consisting of one or more LEDs or a laser light source consisting of one or more laser diodes.

13. The lighting device as claimed in claim 1, wherein the lighting component is operable in one or more operating modes, light for a light function which is assigned to a respective operating mode being provided in the respective operating mode.

14. The lighting device as claimed in claim 13, wherein the one or more operating modes comprise at least one of the following operating modes:

an operating mode for providing a flashing light as a light function;

an operating mode for providing a daytime running light as a light function;

an operating mode for providing a position light as a light function; or an operating mode for providing light sequencing before starting or after parking of the motor vehicle.

15. The lighting device as claimed in claim 13, wherein the lighting component comprises one or more lighting groups each consisting of one or more light sources, each emitting light with a same color, wherein light sources of different groups emit light with a different color.

16. The lighting device as claimed in claim 15, wherein each operating mode is assigned a lighting group and only the light source or the light sources of the assigned lighting group are turned on in the respective operating mode.

17. The lighting device as claimed in claim 1, further comprising at least one further lighting component.

18. The lighting device as claimed in claim 1, wherein the lighting component, the one or more translucent optical components and the one or more transparent facet bodies are accommodated in a common housing which comprises a translucent lens for light exit.

19. The lighting device as claimed in claim 1, wherein the lighting device is configured to be installed above a vehicle headlamp in a vertical direction.

20. A motor vehicle comprising the lighting device as claimed in claim 18.

\* \* \* \* \*